(12) United States Patent
Chatterji et al.

(10) Patent No.: US 6,210,476 B1
(45) Date of Patent: Apr. 3, 2001

(54) FOAMED CEMENT COMPOSITIONS AND METHODS

(75) Inventors: Jiten Chatterji, Duncan; Roger S. Cromwell, Walters; Baireddy R. Reddy, Duncan; Clyde R. Anderson, Marlow; David E. McMechan, Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/390,718

(22) Filed: Sep. 7, 1999

(51) Int. Cl.$^7$ .............................. C04B 24/40; E21B 33/14
(52) U.S. Cl. .................. 106/677; 106/678; 106/681; 106/682; 106/802; 106/803; 106/806; 106/823; 166/293
(58) Field of Search ................................. 106/677, 678, 106/681, 682, 802, 803, 806, 823; 166/293

(56) References Cited

U.S. PATENT DOCUMENTS

| | | | |
|---|---|---|---|
| 5,147,565 | 9/1992 | Bour et al. | 252/8.551 |
| 5,580,378 | 12/1996 | Shulman | 106/677 |
| 5,696,059 | 12/1997 | Onan et al. | 507/269 |
| 5,711,801 | 1/1998 | Chatterji et al. | 106/789 |
| 5,820,670 * | 10/1998 | Chatterji et al. | 106/727 |
| 5,875,845 | 3/1999 | Chatterji et al. | 166/293 |
| 5,897,699 | 4/1999 | Chatterji et al. | 106/678 |

OTHER PUBLICATIONS

Yunsheng Xu, D.D.L. Chung, "Improving the Workability and Strength of Silica Fume Concrete by Using Silane–Treated Silica Fume," *Cement and Concrete Research* 29 (1999), 451–453 (no month).

* cited by examiner

*Primary Examiner*—Anthony Green
(74) *Attorney, Agent, or Firm*—Craig W. Roddy; C. Clark Dougherty, Jr.

(57) ABSTRACT

The present invention provides improved foamed well cement compositions and methods. The foamed cement compositions have improved properties and are basically comprised of hydraulic cement, amorphous silica surface treated with a mixture of organosilane coupling agents, sufficient water to form a slurry, sufficient gas to foam the slurry and a mixture of foaming and foam stabilizing surfactants present in an amount sufficient to facilitate the formation of the foam and stabilize the foamed composition.

30 Claims, No Drawings

FOAMED CEMENT COMPOSITIONS AND METHODS

BACKGROUND OF THE INVENTION

1. Field of the Invention

The present invention relates to improved foamed cement compositions and methods of using the compositions for cementing wells.

2. Description of the Prior Art

Foamed hydraulic cement compositions are utilized in various applications including in surface construction and in subterranean well completion and remedial operations. For example, foamed cement compositions are used in primary well cementing operations whereby strings of pipe such as casings and liners are cemented in well bores. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

In surface construction applications, the cement compositions utilized must often be lightweight. In well applications, the cement compositions must also often be lightweight to prevent excessive hydrostatic pressure from being exerted on subterranean formations penetrated by the well bore whereby the formations are unintentionally fractured. In addition to being lightweight, a foamed cement composition contains compressed gas which improves the ability of the composition to maintain pressure and prevent the flow of formation fluids into and through the cement composition during its transition time, i.e., the time during which the cement composition changes from a true fluid to a hard set mass. Foamed cement compositions are also advantageous because they have low fluid loss properties.

The cement compositions utilized for cementing pipe strings in well bores must develop high strength after setting and also should have sufficient resiliency, i.e., elasticity and ductility, to resist the loss of the cement bond between the pipe and formation. That is, the set cement composition in the annulus between a pipe string and the walls of a well bore often fail due to pipe movements which cause shear and/or compressional stresses to be exerted on the set cement. Such stress conditions are commonly the result of relatively high fluid pressures and/or temperatures inside the cemented pipe string during testing, perforating, fluid injection or fluid production. The high internal pipe pressure and/or temperature results in the expansion of the pipe string both radially and longitudinally, which places stresses on the cement sheath causing it to crack or causing the bonds between the cement composition and the exterior surfaces of the pipe or formation, or both, to fail which allows leakage of formation fluids into or through the well bore.

Stress conditions also result from high pressures which occur inside the cement sheath due to the thermal expansion of fluids trapped within the cement sheath. This condition often occurs as a result of high temperature differentials created during the injection or production of high temperature fluids through the well bore, e.g., wells subjected to steam recovery or the production of hot formation fluids from high temperature formations. Typically, the pressure of the trapped fluids exceeds the collapse pressure of the cement and pipe causing leaks and bond failure. Other compressional stress conditions occur as a result of outside forces exerted on the cement sheath due to formation shifting, overburden pressures, subsidence and/or tectonic creep.

Thus, there are needs for improved cement compositions and methods of utilizing the compositions in wells whereby after setting, the cement compositions form resilient solid masses which have high compressive, tensile and bond strengths sufficient to withstand the above described stresses without failure.

SUMMARY OF THE INVENTION

The present invention provides foamed cement compositions having improved properties upon setting including enhanced resiliency as well as enhanced compressive, tensile and bond strengths. The improved foamed cement compositions of this invention are basically comprised of a hydraulic cement, amorphous silica which has been surface treated with a mixture of organosilane coupling agents, sufficient water to form a slurry, sufficient gas to foam the slurry and a mixture of foaming and foam stabilizing surfactants present in an amount sufficient to facilitate the formation of the foam and stabilize the foamed composition. The organosilane coupling agent mixture used to surface treat the amorphous silica is preferably a mixture of 3-glycidoxypropyltrimethoxy silane and 3-aminopropyltriethoxy silane or a mixture of 3-glycidoxypropyltrimethoxy silane and N-2-(aminoethyl)-3-aminopropyltrimethoxy silane. A 1:1 by weight mixture of 3-glycidoxypropyltrimethoxy silane and 3-aminopropyltriethoxy silane is most preferred.

The improved methods of this invention for cementing in a subterranean zone penetrated by a well bore are comprised of the following steps. A foamed cement composition of the invention is prepared which hardens into a resilient solid mass having high compressive, tensile and bond strengths. The cement composition is placed in the subterranean zone and then allowed to set into a hard solid mass therein.

It is, therefore, a general object of the present invention to provide improved foamed cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The improved foamed cement compositions of this invention are useful in surface construction applications and are particularly suitable for performing a variety of completion and remedial procedures in subterranean zones or formations penetrated by well bores. The foamed cement compositions have improved properties upon setting, e.g., the compositions have enhanced resiliency and high compressive, tensile and bond strengths.

The foamed cement compositions of this invention are basically comprised of hydraulic cement, amorphous silica which has been surface treated with a mixture of an epoxy organosilane coupling agent and an amine organosilane coupling agent, sufficient water to form a slurry, sufficient gas to foam the slurry, and mixture of a foaming and foam stabilizing surfactants sufficient to facilitate the formation of the foam and stabilize the foamed composition.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high alumina content cements, silica cements and high alkalinity cements. Portland cements or their equivalents are generally preferred for use in accordance with the present invention when performing cementing operations in subterranean zones penetrated by well bores. Portland cements of the types defined and described in *API Specification For Materials And Testing For Well Cements*, API Specification 10, 5$^{th}$ Edition, dated Jul. 1, 1990 of the American Petroleum Institute are particularly suitable. Preferred API Portland cements include classes A, B, C, G and H, with API classes G and H being more preferred and class G being the most preferred.

The surface of the amorphous silica useful in accordance with the present invention is pretreated with a mixture of epoxy and amine organosilane coupling agents as will be described below. Various forms of synthetic and natural amorphous silicas can be utilized including, but not limited to, fly ash, fumed silica, rice hull ash, natural pozzolana and the like. Of these, fumed silica is preferred. As mentioned, the amorphous silica utilized is pretreated with organosilane coupling agents whereby the coupling agents connect to the hydroxyl functional groups on the surfaces of the amorphous silica. When the surface treated amorphous silica is combined with cement in a cement composition, the organosilane coupling agents on the surfaces of the amorphous silica readily bond to the surfaces of the cement. The enhanced physical and mechanical properties of the foamed compositions of this invention can be attributed to the formstation of silanol from the organosilanes attached to the amorphous silica. The silanol undergoes immediate dehydration resulting in Si—O—Si bonds between the cement and amorphous silica.

While various organosilane coupling agents can be utilized, the coupling agents are preferably selected from a mixture of 3-glycidoxypropyltrimethoxy silane and 3-aminopropyltriethoxy silane or a mixture of 3-glycidoxypropyltrimethoxy silane and N-2-(aminoethyl)-3-aminopropyltrimethoxy silane. Most preferably, the organosilane coupling agent mixture used to surface treat the amorphous silica is a 1:1 by weight mixture of 3-glycidoxypropyltrimethoxy silane and 3-aminopropyltriethoxy silane.

The pretreatment of the amorphous silica is carried out by combining the organosilanes utilized with ethyl acetate while stirring the ethyl acetate. Thereafter, amorphous silica, preferably fumed silica, is added to the ethyl acetate and organosilanes. The resulting mixture is heated at 170° F. for about 1 hour with continuous stirring, followed by filtration and drying. Thereafter, the treated silica fume is heated to 150° F. in a vacuum for 24 hours. Under these conditions, the amino group of the amino organosilane reacts with the epoxy group of the epoxy organosilane on the surface of the fumed silica.

The hydraulic cement utilized and the organosilane coupling agent surface treated amorphous silica are combined with sufficient water to form a slurry. The amorphous silica is generally present in the slurry in an amount in the range of from about 5% to about 40% by weight of hydraulic cement in the slurry preferably from about 10% to about 20%.

The water utilized to form the cement composition of this invention can be fresh water or salt water. The term "salt water" is used herein to mean unsaturated salt solutions and saturated salt solutions including brines and seawater. The water is included in the cement composition in an amount sufficient to slurry the hydraulic cement and surface treated amorphous silica. Generally, the water is present in the cement composition in an amount in the range of from about 40% to about 65% by weight of hydraulic cement therein, preferably, from about 58% to about 61%.

The gas utilized for foaming the cement and treated amorphous silica slurry can be air or nitrogen, with nitrogen being preferred. The gas is present in an amount sufficient to foam the slurry, generally an amount in the range of from about 10% to about 40% by volume of the slurry, preferably, from about 14% to about 15%.

A variety of foaming and foam stabilizing surfactants can be utilized in accordance with the present invention. A preferred mixture of such surfactants which is described in U.S. Pat. No. 5,897,699 issued to Chatterji et al. on Apr. 27, 1999 is basically comprised of an aqueous solution of an alpha-olefinic sulfonate and cocoylamidopropyl betaine. The disclosure of U.S. Pat. No. 5,897,699 is incorporated herein by reference.

A particularly preferred mixture of foaming and foam stabilizing surfactants for use in accordance with this invention is a mixture comprised of an ethoxylated alcohol ether sulfate of the formula

wherein a is an integer in the range of from about 6 to about 10 and b is an integer in the range of from about 3 to about 10; an alkyl or alkene amidopropyl betaine having the formula

wherein R is a radical selected from the group of decyl, cocoyl, lauryl, cetyl and oleyl; and an alkyl or alkene amidopropyl dimethyl amine oxide having the formula

wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropyl betaine is generally present in the additive in an amount in the range of from about 30 to about 33 parts by weight and the alkyl or alkene aminopropyl dimethyl amine oxide is generally present in the additive in an amount in the range of from about 3 to about 10 parts by weight.

In order to make the surfactant mixture more easily combinable with the slurry of cement and surface treated amorphous silica, water is preferably combined with the mixture in an amount sufficient to dissolve the surfactants.

A particularly preferred mixture of foaming and foam stabilizing surfactants for use in accordance with the present invention is comprised of ethoxylated alcohol ether sulfate wherein "a" in the formula thereof set forth above is an integer in the range of from 6 to 10 and the ethoxylated alcohol ether sulfate is present in the additive in an amount of about 63.3 parts by weight; the alkyl or alkene amidopropyl betaine is cocoylamidopropyl betaine and is present in the additive in an amount of about 31.7 parts by weight; and the alkyl or alkene amidopropyl dimethylamine oxide is cocoylamidopropyl dimethylamine oxide and is present in an amount of about 5 parts by weight. The mixture of foaming and foam stabilizing surfactants is generally included in the foamed cement composition of this invention in an amount in the range of from about 0.5% to about 5% by volume of water in the cement composition prior to being foamed, preferably in an amount of from about 1% to about 3.75%.

A preferred foamed cement composition of the present invention is comprised of Portland cement; foamed silica which has been surface treated with a 1:1 by weight mixture of 3-glycidoxypropyltrimethoxy silane and 3-aminopropyltriethoxy silane present in an amount in the range of from about 10% to about 20% by weight of cement in the composition; water present in an amount in the range of from about 58% to about 61% by weight of cement in the composition; nitrogen present in an amount in the range of from about 14% to about 15% by volume of the composition; and a mixture of foaming and foam stabilizing surfactants comprised of an ethoxylated alcohol ether sulfate present in an amount of about 63.3 parts by weight of the mixture, cocoylamidopropyl betaine present in an amount of about 31.7 parts by weight of the mixture and cocoylamidopropyl dimethylamine oxide present in an amount of about 5 parts by weight of the mixture, the foaming and foam stabilizing surfactant mixture being present in the composition in an amount in the range of from about 1% to about 1.5% by weight of water therein.

The foamed cement compositions of this invention may be prepared in accordance with any of the mixing techniques utilized in the art. In a preferred method, a quantity of water is introduced into a cement blender followed by the hydraulic cement and surface treated amorphous silica utilized. The mixture is agitated for a sufficient period of time to form a pumpable non-foamed slurry. The slurry is then pumped to the well bore or other site of use, and the foaming and foam stabilizing surfactant followed by the gas utilized are injected into the slurry on the fly. As the slurry and gas flow to the location where the resulting foamed cement composition is to be placed, e.g., through the well bore to a subterranean zone to be cemented, the slurry is foamed and stabilized. As will be understood by those skilled in the art, various additives can be included in the foamed cement compositions such as dispersing agents, set retarding agents, set accelerating agents and the like.

The improved methods of this invention for cementing in a subterranean zone penetrated by a well bore basically comprise the steps of preparing a foamed cement composition of this invention, pumping the foamed cement composition into the subterranean zone to be cemented by way of the well bore and then allowing the foamed cement composition to set into a resilient impermeable mass therein.

In order to further illustrate the improved cement compositions and methods of this invention, the following examples are given.

EXAMPLE 1

Fumed silica was surface treated with organosilane coupling agents as follows. 2,500 milliliters of ethyl acetate was added to a 5 liter flask equipped with a stirrer. 2.5 grams of 3-glycidoxypropyltrimethoxy silane and 2.5 grams of 3-aminopropyltriethoxy silane were added to the ethyl acetate with stirring. 500 grams of fumed silica were then added to the ethyl acetate-organosilane mixture with continuous stirring. The mixture was heated to 170° F. and held at that temperature for 1 hour while continuing the stirring. Thereafter, the solids in the mixture were filtered from the mixture and dried. The resulting surface treated fumed silica was heated to 150° F. in a vacuum oven for an additional 24 hours during which time the amino group of the amino organosilane reacted with the epoxy group of the epoxy organosilane on the surface of the fumed silica. The resulting surface treated fumed silica was subjected to infrared spectroscopy which showed 3 new bands at 1,118.89 $cm^-$, 113.77 $cm^-$ and 1,105 $cm^-$ indicating the reaction of the organosilanes with the fumed silica.

EXAMPLE 2

Test foamed cement compositions were prepared with varying quantities of untreated fumed silica and the surface treated fumed silica prepared as described above. The foamed cement compositions included Portland API Class G cement, untreated or surface-treated fumed silica, fresh water, air and a foaming and foam stabilizing surfactant mixture. Some of the compositions also included a dispersing agent. The dispersing agent used was a condensation polymer product of acetone, formaldehyde and sodium bisulfite which is commercially available under the trade designation "CFR-3™" from Halliburton Energy Services, Inc. of Duncan, Okla. The foaming and foam stabilizing surfactant mixture used was a mixture of an ethoxylated alcohol ether sulfate, cocoylamidopropyl betaine and cocoylamidopropyl dimethylamine oxide which is also commercially available from Halliburton Energy Services, Inc. of Duncan, Okla. The test foamed cement composition components and their amounts are given in Table I below.

TABLE I

Test Foamed Cement[1] Compositions

| Test Cement Composition No. | Untreated Fumed Silica, % by weight of cement | Surface Treated Fumed Silica[2], % by weight of cement | Dispersing Agent[3], % by weight of cement | Fresh Water, % by weight of cement | Foaming and Foam Stabilizing Agent[4], % by weight of water |
|---|---|---|---|---|---|
| 1 | 10 | — | 0.25 | 57.87 | 1 |
| 2 | — | 10 | 0.25 | 57.87 | 1 |
| 3 | 10 | — | — | 57.87 | 1 |
| 4 | — | 10 | — | 57.87 | 1 |
| 5 | 15 | — | 0.5 | 59.64 | 1 |
| 6 | — | 15 | 0.5 | 59.64 | 1 |
| 7 | 15 | — | — | 59.64 | 1 |
| 8 | — | 15 | — | 59.64 | 1 |
| 9 | 20 | — | 0.75 | 61.41 | 1 |

TABLE I-continued

Test Foamed Cement[1] Compositions

| Test Cement Composition No. | Untreated Fumed Silica, % by weight of cement | Surface Treated Fumed Silica[2], % by weight of cement | Dispersing Agent[3], % by weight of cement | Fresh Water, % by weight of cement | Foaming and Foam Stabilizing Agent[4], % by weight of water |
|---|---|---|---|---|---|
| 10 | — | 20 | 0.75 | 61.41 | 1 |
| 11 | 20 | — | — | 61.41 | 1 |
| 12 | — | 20 | — | 61.41 | 1 |

[1]Portland API Class G Cement
[2]Treated with 1:1 by weight 3-glycidoxypropyltrimethoxy silane and 3-aminopropyltriethoxy silane in an amount of 1% by weight of fumed silica
[3]Condensation polymer product of acetone, formaldehyde and sodium bisulfite
[4]Mixture of ethoxylated alcohol ether sulfate, cocoamidopropyl betaine and cocoylamidopropyl dimethyl amine oxide.

Portions of the test foamed cement compositions of Table I were allowed to set at 140° F. for 72 hours. The set portions were used to measure the properties of the compositions. That is, the compressive strengths of the samples were determined in accordance with the procedure set forth in the *API Specification For Materials And Testing For Well Cements*, API Specification 10, 5th Edition, dated Jul. 1, 1990 of the American Petroleum Institute. Some of the portions of the test foamed cement compositions were caused to set in the annuluses of pipe assemblies, i.e., small pipes centered inside larger pipes. After setting, the shear bond strength of each portion was determined by supporting the larger pipe and applying force to the smaller inner pipe. The shear bond strength is the total force applied divided by the bonded surface area which breaks. Additional set portions of the test foamed cement compositions were tested for tensile strength and friction angle as well as for plastic failure, Young's modulus (also known as the modulus of elasticity), Poisson's ratio, bulk modulus and shear modulus, all in accordance with the standard tests and procedures of the American Society for Testing and Materials (ASTM) set forth, for example, in ASTM Section D 1456. The results of the tests are set forth in Tables II, III and IV below.

TABLE II

Shear Bond, Tensile and Compressive Strengths And Friction Angle Test Results

| Test Cement Composition No. | Shear-Bond Strength, psi | Tensile Strength, psi | Brazilian Tensile Strength, psi | Compressive Strength, psi | Friction Angle Average, Degrees |
|---|---|---|---|---|---|
| 1 | 370 | 215 | 295 | 2200 | 7.15 |
| 2 | 516 | 282 | 331 | 2575 | 8.13 |
| 3 | 240 | 294 | 321 | 2260 | 19.10 |
| 4 | 354 | 310 | 318 | 2610 | 18.86 |
| 5 | 312 | 242 | 297 | 2310 | 15.70 |
| 6 | 513 | 335 | 328 | 2730 | 11.16 |
| 7 | 279 | 366 | 345 | 2490 | 22.66 |
| 8 | 429 | 388 | 345 | 3050 | 10.90 |
| 9 | 455 | 297 | 305 | 3040 | 21.25 |
| 10 | 460 | 426 | 351 | 3080 | 13.00 |
| 11 | 190 | 281 | 241 | 2850 | 26.50 |
| 12 | 460 | 418 | 357 | 3470 | 15.25 |

TABLE III

Plastic Failure, Young's Modulus And Poisson's Ratio Test Results

| Test Cement Composition No. | Plastic Failure, psi Confining Pressure, psi | | | | Young's Modulus, E × 10[5] psi Confining Pressure, psi | | | | Poisson's Ratio Confining Pressure, psi | | | |
|---|---|---|---|---|---|---|---|---|---|---|---|---|
| | 0 | 500 | 1000 | 2000 | 0 | 500 | 1000 | 2000 | 0 | 500 | 1000 | 2000 |
| 1 | 1957 | 3052 | 3634 | 4669 | 8.35 | 6.04 | 6.05 | 2.77 | 0.129 | 0.146 | 0.163 | 0.125 |
| 2 | 2357 | 2914 | 3743 | 4937 | 8.50 | 6.43 | 5.72 | 4.99 | 0.117 | 0.164 | 0.158 | 0.171 |
| 3 | 1381 | 2857 | 3876 | 4606 | 6.78 | 4.27 | 4.94 | 1.10 | 0.062 | 0.118 | 0.211 | 0.103 |
| 4 | 1675 | 2823 | 3823 | 4659 | 8.42 | 6.60 | 4.92 | 4.76 | 0.107 | 0.171 | 0.188 | 0.215 |
| 5 | 2564 | 2782 | 4305 | 4466 | 8.62 | 4.45 | 5.34 | 2.08 | 0.122 | 0.186 | 0.103 | 0.134 |
| 6 | 2171 | 3258 | 4088 | 5037 | 7.21 | 7.07 | 6.00 | 3.55 | 0.091 | 0.153 | 0.236 | 0.146 |
| 7 | 1790 | 3337 | 4429 | 5321 | 8.27 | 6.52 | 3.33 | 1.49 | 0.089 | 0.188 | 0.120 | 0.063 |
| 8 | 2227 | 3289 | 3911 | 5186 | 5.94 | 6.35 | 5.85 | 3.45 | 0.064 | 0.218 | 0.108 | 0.146 |
| 9 | 1821 | 3341 | 4334 | 5528 | 5.34 | 6.43 | 5.38 | 4.57 | 0.078 | 0.162 | 0.181 | 0.156 |
| 10 | 2755 | 3527 | 4254 | 5944 | 9.48 | 7.99 | 5.58 | 6.74 | 0.123 | 0.167 | 0.133 | 0.172 |
| 11 | 1353 | 3513 | 4302 | 6173 | 4.10 | 2.96 | 1.69 | 3.33 | 0.057 | 0.105 | 0.125 | 0.136 |
| 12 | 2368 | 3314 | 4228 | 5535 | 7.95 | 7.23 | 5.20 | 3.39 | 0.114 | 0.125 | 0.125 | 0.083 |

TABLE IV

Bulk Modulus And Shear Modulus Test Results

| Test Cement Composition No. | Bulk Modulus, E × 10⁵ psi Confining Pressure psi | | | | Shear Modulus, E × 10⁵ psi Confining Pressure, psi | | | |
|---|---|---|---|---|---|---|---|---|
| | 0 | 500 | 1000 | 200 | 0 | 500 | 1000 | 2000 |
| 1 | 3.75 | 2.84 | 2.99 | 1.23 | 3.70 | 2.64 | 2.60 | 1.23 |
| 2 | 3.70 | 3.19 | 2.79 | 2.53 | 3.80 | 2.76 | 2.47 | 2.13 |
| 3 | 2.58 | 1.86 | 2.85 | 46.2 | 3.19 | 1.19 | 2.04 | 49.9 |
| 4 | 3.57 | 3.35 | 2.63 | 2.79 | 800 | 2.82 | 2.07 | 1.96 |
| 5 | 3.80 | 2.36 | 2.24 | 94.6 | 3.84 | 1.88 | 2.42 | 91.7 |
| 6 | 2.94 | 3.39 | 3.79 | 1.64 | 3.30 | 3.07 | 2.43 | 1.55 |
| 7 | 3.35 | 3.49 | 1.46 | 56.8 | 3.80 | 2.74 | 1.49 | 70.1 |
| 8 | 2.27 | 3.75 | 2.49 | 1.63 | 2.79 | 2.61 | 2.64 | 1.50 |
| 9 | 2.11 | 3.17 | 2.81 | 2.21 | 2.48 | 2.77 | 2.28 | 1.98 |
| 10 | 4.19 | 4.00 | 2.54 | 3.42 | 4.22 | 3.42 | 2.46 | 2.88 |
| 11 | 1.54 | 1.25 | 75.1 | 1.53 | 1.94 | 1.34 | 75.1 | 1.47 |
| 12 | 3.44 | 3.22 | 2.31 | 1.32 | 3.57 | 3.21 | 2.31 | 1.52 |

Table II shows the compressive strengths, pipe-in-pipe shear bond strengths, tensile strengths and friction angle for the various test foamed cement compositions. Untreated fumed silica has a large surface area resulting in a water requirement of 333 times its weight. The treatment of the fumed silica with organosilane coupling agents reduces the large water requirement. As shown in Table II, the addition of organosilane treated fumed silica to Portland cement significantly increases the compressive, shear bond and tensile strengths of the set foamed cement as compared to when untreated fumed silica is included therein. The comparison in Table II also shows that the increases in shear bond, tensile and compressive strengths are obtained without decreasing the elasticity of the set foamed cement as shown by the friction angle. A low friction angle means that the tested foamed cement composition was subjected to more plastic deformation than a test composition having a higher friction angle. The increased shear bond when surface treated fumed silica is included in a test foamed cement composition indicates that the composition will have a strong bond to a subterranean formation and a pipe string cemented therein so that the invasion of the annulus by formation fluids will be prevented. The high tensile strength and other mechanical properties of the set foamed cement compositions including surface treated fumed silica makes the low density foamed cement compositions ideal for use in many well cementing applications.

Tables III and IV show the plastic failure, Young's modulus, Poisson's ratio, bulk modulus and shear modulus under confining pressures of 0, 500, 1,000 and 2,000 psi. A direct comparison between test foamed cement compositions containing surface treated fumed silica and untreated fumed silica is shown. The average plastic failure of the set foamed compositions containing surface treated fumed silica was 4.6% higher than the set foamed cement compositions containing untreated fumed silica with a standard deviation of 14%. The effect on Poisson's ratio was similar in that the set foamed cement compositions containing surface treated fumed silica were 7.6% higher than the set foamed cement compositions containing untreated fumed silica with a 28% standard deviation. The average Young's modulus was 24% higher for the set foamed cement compositions containing surface treated fumed silica with a standard deviation of 29%. This represents a significant increase in elasticity for the set foamed cement compositions containing surface treated fumed silica. The bulk and shear modulus showed similar increases since the change in Poisson's ratio was small. All of the test cement compositions exhibited significant plastic deformation before failure and the maximum compressive strength was in the plastic deformation region.

Thus, the present invention is well adapted to carry out the objects and attain the advantages mentioned as well as those which are inherent therein. While numerous changes may be made by those skilled in the art, such changes are encompassed within the spirit of this invention as defined by the appended claims.

What is claimed is:

1. A foamed composition having improved properties upon setting including enhanced resiliency and enhanced compressive, tensile and bond strengths comprising:

hydraulic cement;

amorphous silica which has been surface treated with a mixture of organosilane coupling agents present in an amount in the range of from about 5% to about 40% by weight of hydraulic cement in said composition;

sufficient water to form a slurry;

sufficient gas to foam said slurry; and a mixture of foaming and foam stabilizing surfactants present in an amount sufficient to facilitate the formation of said foam and stabilize said foamed composition.

2. The composition of claim 1 wherein said amorphous silica is fumed silica.

3. The composition of claim 1 wherein said mixture of organosilane coupling agents used to surface treat said amorphous silica is selected from the group consisting of a mixture of 3-glycidoxypropyltrimethoxy silane and 3-aminopropyltriethoxy silane and a mixture of 3-glycidoxypropyltrimethoxy silane and N-2-(aminoethyl)-3-aminopropyltrimethoxy silane.

4. The composition of claim 1 wherein said mixture of organosilane coupling agents used to surface treat said amorphous silica is a 1:1 by weight mixture of 3-glycidoxypropyltrimethoxy silane and 3-aminopropyltriethoxy silane.

5. The composition of claim 1 wherein said hydraulic cement is selected from the group consisting of Portland cements, slag cements, pozzolana cements, gypsum cements, alumina cements, silica cements and alkaline cements.

6. The composition of claim 1 wherein said hydraulic cement is Portland cement.

7. The composition of claim 1 wherein said water is selected from the group consisting of fresh water, unsaturated salt solutions and saturated salt solutions.

8. The composition of claim 1 wherein said water is present in an amount in the range of from about 40% to about 65% by weight of hydraulic cement in said composition.

9. The composition of claim 1 wherein said gas is selected from the group consisting of air and nitrogen.

10. The composition of claim 1 wherein said gas is present in an amount in the range of from about 10% to about 40% by volume of said composition.

11. The composition of claim 1 wherein said foaming and foam stabilizing surfactant is a mixture comprised of:

an ethoxylated alcohol ether sulfate surfactant of the formula $$H(CH_2)_a(OC_2H_4)_bOSO_3NH_4^+$$

wherein a is an integer in the range of from about 6 to about 10 and b is an integer in the range of from about 3 to about 10 and said surfactant is present in said additive in an amount in the range of from about 60 to about 64 parts by weight;

an alkyl or alkene amidopropyl betaine surfactant having the formula

wherein R is a radical selected from the group of decyl, cocoyl, lauryl, cetyl and oleyl and said surfactant is present in said additive in an amount in the range of from about 30 to about 33 parts by weight; and an alkyl or alkene amidopropyl dimethyl amine oxide surfactant having the formula

wherein R is a radical selected from the group of decyl, cocoyl, lauryl, cetyl and oleyl and said surfactant is present in said additive in an amount in the range of from about 3 to about 10 parts by weight.

12. The composition of claim 11 wherein "a" in said formula of said ethoxylated alcohol ether sulfate surfactant is an integer in the range of from 6 to 8 and said surfactant is present in said additive in an amount of about 63.3 parts by weight.

13. The composition of claim 11 wherein "R" in said formula of said alkyl or alkene amidopropyl betaine surfactant is cocoyl and said surfactant is present in said additive in an amount of about 31.7 parts by weight.

14. The composition of claim 11 wherein "R" in said formula of said alkyl or alkene amidopropyl dimethyl amine oxide surfactant is cocoyl and said surfactant is present in said additive in an amount of about 5 parts by weight.

15. The composition of claim 11 which further comprises water present in an amount sufficient to dissolve said surfactants.

16. The composition of claim 1 wherein said foaming and foam stabilizing surfactant is present in said composition in an amount in the range of from about 0.5% to about 5% by volume of said water therein.

17. The composition of claim 16 wherein said water is selected from the group consisting of fresh water, unsaturated salt solutions and saturated salt solutions.

18. A foamed cement composition having improved properties upon setting including enhanced resiliency and enhanced compressive, tensile and bond strengths comprising:

Portland cement;

amorphous silica which has been surface treated with a 1:1 by weight mixture of 3-glycidoxypropltrimethoxy silane and 3-aminopropyltriethoxy silane present in an amount in the range of from about 10% to about 20% by weight of hydraulic cement in said composition;

water present in an amount in the range of from about 58% to about 61% by weight of said hydraulic cement in said composition;

nitrogen present in an amount in the range of from about 14% to about 15% by volume of said composition; and a mixture of foaming and foam stabilizing surfactants comprised of an ethoxylated alcohol ether sulfate present in an amount of about 63.3 parts by weight of said mixture, cocoylamidopropyl betaine present in an amount of about 31.7 parts by weight of said mixture and cocoylamidopropyl dimethylamine oxide present in an amount of about 5 parts by weight of said mixture, said foaming and foam stabilizing surfactant mixture being present in said composition in an amount in the range of from about 1% to about 3.75% by weight of water therein.

19. A method of cementing in a subterranean zone penetrated by a well bore comprising the steps of:

(a) preparing a foamed cement composition comprised of hydraulic cement, amorphous silica which has been surface treated with a mixture of organosilane coupling agents present in said composition in an amount in the range of from about 5% to about 40% by weight of hydraulic cement in said composition, sufficient water to form a slurry, sufficient gas to foam said slurry and a mixture of foaming and foam stabilizing surfactants present in an amount sufficient to facilitate the formation of said foam and stabilize said foamed composition;

(b) placing said foamed cement composition into said subterranean zone; and (c) allowing said foamed cement composition to set into a resilient solid mass therein.

20. The method of claim 19 wherein amorphous silica in said composition is fumed silica.

21. The method of claim 19 wherein said organosilane coupling agents used to surface treat said amorphous silica in said composition is selected from the group consisting of a mixture of 3-glycidoxypropyltrimethoxy silane and 3-aminopropyltriethoxy silane and a mixture of 3-glycidoxypropyltrimethoxy silane and N-2-(aminoethyl)-3-aminopropyltrimethoxy silane.

22. The method of claim 19 wherein said mixture of organosilane coupling agents used to surface treat said amorphous silica in said composition is a 1:1 by weight mixture of 3-glycidoxypropyltrimethoxy silane and 3-aminopropyltriethoxy silane.

23. The method of claim 19 wherein said amorphous silica which has been surface treated with a mixture of organosilane coupling agents is present in said composition in an amount in the range of from about 10% to about 20% by weight of hydraulic cement in said composition.

24. The method of claim 19 wherein said hydraulic cement in said composition is selected from the group consisting of Portland cements, slag cements, pozzolana cements, gypsum cements, alumina cements, silica cements and alkaline cements.

25. The method of claim 19 wherein said hydraulic cement in said composition is Portland cement.

26. The method of claim 19 wherein said water in said composition is selected from the group consisting of fresh water, unsaturated salt solutions and saturated salt solutions.

27. The method of claim 19 wherein said water in said composition is present in an amount in the range of from about 40% to about 65% by weight of hydraulic cement in said composition.

28. The method of claim 19 wherein said gas in said composition is selected from the group consisting of air and nitrogen.

29. The method of claim 19 wherein said gas in said composition is present in an amount in the range of from about 10% to about 40% by volume of said composition.

30. The method of claim 19 wherein said mixture of foaming and foam stabilizing surfactants in said composition is comprised of an ethoxylated alcohol ether sulfate present in an amount of about 63.3 parts by weight of said mixture, cocoylamidopropyl betaine present in an amount of about 31.7 parts by weight of said mixture and cocoylamidopropyl dimethylamine oxide present in an amount of about 5 parts by weight of said mixture, said foaming and foam stabilizing surfactant being present in said composition in an amount in the range of from about 0.5% to about 5% by weight of water therein.

* * * * *